(12) United States Patent
Takahashi et al.

(10) Patent No.: US 8,915,125 B2
(45) Date of Patent: Dec. 23, 2014

(54) CYLINDER INTERNAL-PRESSURE SENSOR FOR ENGINE

(75) Inventors: Kazuo Takahashi, Nagano (JP); Aki Sudou, Nagano (JP); Takayuki Hayashi, Nagano (JP)

(73) Assignee: Citizen Finetech Miyota Co., Ltd., Tokyo (JP)

( * ) Notice: Subject to any disclaimer, the term of this patent is extended or adjusted under 35 U.S.C. 154(b) by 0 days.

(21) Appl. No.: 14/004,282

(22) PCT Filed: Mar. 29, 2012

(86) PCT No.: PCT/JP2012/002182
§ 371 (c)(1),
(2), (4) Date: Sep. 10, 2013

(87) PCT Pub. No.: WO2012/132450
PCT Pub. Date: Oct. 4, 2012

(65) Prior Publication Data
US 2014/0083388 A1 Mar. 27, 2014

(30) Foreign Application Priority Data

Mar. 31, 2011 (WO) .................. PCT/JP2011/001976

(51) Int. Cl.
G01M 15/08 (2006.01)
F02F 1/00 (2006.01)
G01L 23/22 (2006.01)
G01L 23/10 (2006.01)
F02D 35/02 (2006.01)

(52) U.S. Cl.
CPC ................. *F02F 1/00* (2013.01); *G01L 23/222* (2013.01); *G01L 23/10* (2013.01); *F02D 35/023* (2013.01)
USPC ...................................... 73/114.18

(58) Field of Classification Search
USPC ......................................... 73/114.18, 114.16
See application file for complete search history.

(56) References Cited

U.S. PATENT DOCUMENTS 5,693,936 A * 12/1997 Komachiya et al. ..... 250/227.17
5,831,263 A * 11/1998 Komachiya et al. ..... 250/227.17
(Continued)

FOREIGN PATENT DOCUMENTS

JP 58-144247 U 9/1983
JP 59-211835 A 11/1984
JP 63-235841 A 9/1988
(Continued)

*Primary Examiner* — Freddie Kirkland, III
(74) *Attorney, Agent, or Firm* — Birch, Stewart, Kolasch & Birch, LLP (57) ABSTRACT

A cylinder internal-pressure sensor is provided with a housing unit 2 composed of an outer cylinder portion 2e and an inner cylinder portion 2i having elastic portions 2es and 2is having elasticity in an axial direction Fs formed on an intermediate portion Xm in the axial direction Fs; a pressure-receiving ring block portion 3 hermetically fixed between the outer cylinder portion 2e and the inner cylinder portion 2i located on the fronts of the elastic portions 2es and 2is and faced with the rear of the elastic portions 2e and 2i through the elastic portions 2e and 2i and having a front surface 3f as a pressure receiving surface; at least one or more pressure detection elements 5a, 5b, 5c, . . . in contact with one electrode portion 4 provided on a rear surface 3r of this pressure-receiving ring block portion 3, given the internal pressure Pc by the pressure-receiving ring block portion 3 and arranged at predetermined positions in a peripheral direction Ff; and a support ring block portion 6 fixed between the outer cylinder portion 2e and the inner cylinder portion 2i, having a front surface 6f as a support surface supporting the pressure detection elements 5a . . . and serving also as the other electrode 7.

20 Claims, 7 Drawing Sheets

(56) References Cited

U.S. PATENT DOCUMENTS

| | | | |
|---|---|---|---|
| 6,701,775 B1 * | 3/2004 | Popielas et al. | 73/35.12 |
| 6,739,183 B1 * | 5/2004 | Kestly | 73/114.18 |
| 7,111,505 B2 * | 9/2006 | Kestly et al. | 73/114.18 |
| 7,310,993 B2 * | 12/2007 | Popielas et al. | 73/35.12 |
| 8,371,156 B2 * | 2/2013 | Toth et al. | 73/114.18 |
| 8,375,800 B2 * | 2/2013 | Lesnau et al. | 73/744 |

FOREIGN PATENT DOCUMENTS

| | | |
|---|---|---|
| JP | 4-34327 A | 2/1992 |
| JP | 11-94675 A | 4/1999 |
| JP | 2000-277233 A | 10/2000 |

* cited by examiner

CYLINDER INTERNAL-PRESSURE SENSOR FOR ENGINE

TECHNICAL FIELD

The present invention relates to a cylinder internal-pressure sensor for an engine configured having a ring shape suitable in use during detection of an internal pressure of a cylinder.

BACKGROUND ART

In general, a cylinder internal-pressure sensor for an engine for detecting an internal pressure (combustion pressure) of a cylinder by being faced with a combustion chamber of an engine is known, but this type of cylinder internal-pressure sensor needs to be mounted independently with a highly hermetical structure in a through hole formed at a predetermined position of the cylinder. Thus, a cylinder internal-pressure sensor in which the cylinder internal-pressure sensor is configured having a ring shape and capable of being mounted integrally on an outer peripheral surface of a distal end portion of an ignition plug which is another functional component attached to the engine, so that the cylinder internal-pressure sensor can be mounted on the cylinder along with the ignition plug.

As a cylinder internal-pressure sensor configured having such ring shape, a combustion pressure sensor disclosed in Patent Literature 1, a pressure sensor disclosed in Patent Literature 2, and a spark plug incorporating a pressure sensor disclosed in Patent Literature 3 are known.

The combustion pressure sensor in Patent Literature 1 is a combustion pressure sensor having an insulating body formed around a center electrode and a washer member electrically connected to a side electrode and formed around the insulating body, and incorporated in an ignition plug, provided with a piezo-electric element formed of lithium niobate installed between the insulating body and the washer member and also in the vicinity of an ignition gap between the center electrode and the side electrode. Moreover, the pressure sensor in Patent Literature 2 is a pressure sensor joined to an attachment hole instead of a gasket of a spark plug, and this pressure sensor is configured such that a mounting surface of a housing is brought into pressure contact with a cylinder head, and a radiation fin is fastened to the housing. Furthermore, the spark plug incorporating a pressure sensor in Patent Literature 3 is provided with a seat portion facing a plug mounting surface provided in an internal combustion engine when being mounted on the internal combustion engine; an accommodating member incorporated in this seat portion and holding a plurality of piezo-electric elements at predetermined intervals in a peripheral direction of an inner wall surface of the seat portion; an electrode plate formed having a planar shape corresponding to this accommodating member and having a terminal with a notched portion bent upward and a notched portion formed by the bending being provided on an upper surface of the accommodating member in a state not overlapped with the piezo-electric elements; an insulating plate formed having a planar shape corresponding to this electrode plate having a notched portion formed and provided on the upper surface of the electrode plate in a state where a terminal of the electrode plate protrudes upward from the notched portion; and a taking-out member connected to the terminal protruding from the notched portion of this insulating plate and for taking out an output of the piezo-electric elements.

CITATION LIST

Patent Literature

Patent Literature 1: Japanese Unexamined Patent Application Publication No. H4-34327
Patent Literature 2: Japanese Unexamined Patent Application Publication No. H11-94675
Patent Literature 3: Japanese Unexamined Patent Application Publication No. 2000-277233

SUMMARY OF INVENTION

Technical Problem

However, the above described prior-art cylinder internal-pressure sensor for an engine configured having a ring shape has the following problems.

That is, in this type of cylinder internal-pressure sensor, a pressure detection element to be used for detecting the combustion pressure of the engine is preferably a single crystal material having high heat resistance and favorable piezo-electric characteristics even in a high-temperature environment. On the other hand, since the single crystal material is highly fragile, a high level of machining technology is required for cutting the single crystal material and cutting out a pressure detection element having a ring shape as in the above described Patent Literatures 1 and 2, and manufacture is not easy. In the end, yield and mass productivity are lowered, and it can not be ignored as a cost-raising factor. Moreover, since the entirety needs to be formed having an elongated ring shape, it is concerned that nonconformity such as a crack might occur if it is attached to an engine with large vibration, and reliability is not necessarily high as a pressure detection element.

On the other hand, in Patent Literature 3, since the pressure detection element is configured to be formed as a cuboid chip body and a plurality of chip bodies are arranged in a ring shape, the above described problem in manufacture (machining) of the integrally formed ring shape does not occur. But on the contrary, variation in dimensions and angles of each chip body directly influences characteristics (performances) of the cylinder internal-pressure sensor, and as a result, there is a problem that deterioration of detection accuracy and product variation can easily occur.

Moreover, in either case, since the combustion pressure of the engine is detected, internal structures of the pressure detection element, the electrode and the like need to be protected as much as possible from severe temperature and vibration environments. However, they are not necessarily sufficient in the entire detection structure, and there is room for further improvement from a viewpoint of ensuring stable attachment and stable operation of the cylinder internal-pressure sensor.

The present invention has an object to provide a cylinder internal-pressure sensor which solves the problems in such prior-art technologies.

Solution to Problem

In order to solve the above described problems, the present invention is characterized by including, in constituting a cylinder internal-pressure sensor 1 for an engine formed having a ring shape for detecting an internal pressure Pc of a cylinder Ec by being attached to outer peripheral surfaces Mas and Mbs of distal end portions of functional components Ma and Mb faced with a combustion chamber Rb of the engine, a housing unit 2 composed of an outer cylinder portion 2e and an inner cylinder portion 2i having elastic portions 2es and 2is having elasticity in an axial direction Fs formed on an intermediate portion Xm in the axial direction Fs; a pressure-receiving ring block portion 3 hermetically fixed between the outer cylinder portion 2e and the inner cylinder portion 2i located on the fronts of the elastic portions 2es and 2is and faced with the rear of the elastic portions 2e and 2i through the elastic portions 2e and 2i and having a front surface 3f as a pressure receiving surface; at least one or more pressure detection elements 5a, 5b, 5c, . . . in contact with one electrode portion 4 provided on a rear surface 3r of this pressure-receiving ring block portion 3, given the internal pressure Pc by the pressure-receiving ring block portion 3, and arranged at predetermined positions in a peripheral direction Ft and a support ring block portion 6 fixed between the outer cylinder portion 2e and the inner cylinder portion 2i, having a front surface 6f as a support surface supporting the pressure detection elements 5a . . . and serving also as the other electrode 7.

In this case, according to a preferred mode of the invention, one or two or more spacers 10a . . . , 10as . . . , and 10at . . . in the peripheral direction Ff are preferably arranged on a portion in contact with a rear surface portion of the pressure receiving ring block portion 3 and excluding the pressure detection elements 5a . . . . At this time, it is more preferable that the pressure detection elements 5a . . . and the spacers 10a . . . , 10as . . . , and 10at . . . are alternately arranged in the peripheral direction Ff of the pressure-receiving ring block portion 3, and a length in the axial direction Fs of each of the spacers 10a . . . , 10as . . . , and 10at . . . is selected in association with a length of each of the pressure detection elements 5a . . . in the axial direction Fs. On the other hand, the elastic portions 2es and 2is can be provided by forming bent portions (or curved portions) 11e and 11i in the intermediate portion Xm of the outer cylinder portion 2e and the inner cylinder portion 2i. Moreover, the pressure-receiving ring block portion 3 can be constituted by a pressure receiving ring main body portion 12 disposed on the front side and an insulating block portion 13 brought into contact with the pressure receiving ring main body portion 12 by being disposed on the rear side, and a single crystal material can be used for the pressure detection elements 5a . . . .

On the other hand, front surfaces 5af . . . of the pressure detection elements 5a . . . , a rear surface 3r of the pressure-receiving ring block portion 3, rear surfaces 5ar . . . of the pressure detection elements 5a . . . , and the front surface 6f of the support ring block portion 6 can be coated with a bonding layer C formed of an inner layer Ci which becomes an adhesion reinforcing layer, an intermediate layer Cm which becomes a diffusion preventing layer, and an outer layer Ce which becomes a diffusion layer. Moreover, on the rear surface 3r of the pressure-receiving ring block portion 3, the front surface 6f of the support ring block portion 6, the front surfaces 5af . . . of the pressure detection elements 5a . . . or the rear surfaces 5ar . . . of the pressure detection elements 5a . . . , an alignment control layer 14 for the pressure detection elements 5a . . . using a molten bonding layer having a predetermined thickness Ls can be provided. Furthermore, on a portion where there is no pressure detection elements 5a . . . in the one electrode 4, a connector portion 16 to which a lead 15 is to be connected can be provided, and at this time, a compressed spring 17 interposed between the lead 15 and the one electrode 4 can be provided in the connector portion 16. For the functional components (Ma, Mb), an injector Ma for injecting fuel into the cylinder Ec or an ignition plug Mb for igniting the fuel in the cylinder Ec can be applied.

Advantageous Effects of Invention

According to the cylinder internal-pressure sensor 1 for an engine according to the present invention as above, the following marked advantages can be exerted.

(1) For the housing unit 2 composed of the outer cylinder portion 2e and the inner cylinder portion 2i having the elastic portions 2es and 2is having elasticity in the axial direction Fs formed on the intermediate portion Xm in the axial direction Fs, the pressure-receiving ring block portion 3, the one electrode 4, at least one or more pressure detection elements 5a . . . , and the support ring block portion 6 serving also as the other electrode 7 are disposed sequentially from the front side between the outer cylinder portion 2e and the inner cylinder portion 2i in configuration. Thus, a pressure received by the pressure-receiving ring block portion 3 can be transmitted to each of the pressure detection elements 5a . . . stably (uniformly) and reliably by the expanding/contracting elastic portions 2es and 2is, and highly accurate pressure detection can be made.

(2) At least one or more pressure detection elements 5a . . . in contact with the one electrode portion 4 provided on the rear surface 3r of the pressure-receiving ring block portion 3 having the front surface 3f as the pressure receiving surface and arranged at equal intervals in the peripheral direction Ff are used. Thus, even if the cylinder internal-pressure sensor 1 is configured by using a single crystal material having large fragility for the pressure detection elements 5a . . . , and having a ring shape to be attached to the outer peripheral surfaces Mas and Mbs at the distal end portions of the functional components Ma and Mb faced with the combustion chamber Rb of the engine, manufacture (machining) of the pressure detection elements 5a . . . becomes easy, which can contribute to improvement of yield and mass productivity and moreover to cost down, prevention of nonconformity such as a crack, and reliability can be also improved.

(3) Since the entire detection structure such as the pressure detection elements 5a . . . , the electrodes 4 and 7 and the like is covered by the cylindrical (ring-shaped) housing unit 2, the entire detection structure can be effectively protected from the severe temperature and vibration environments when the combustion pressure of the engine is detected, stable attachment and stable operation can be ensured for the cylinder Ec, easy attachment to the various functional components such as the injector Ma, the ignition plug Mb and the like can be realized, and the cylinder internal-pressure sensor 1 with high usability can be obtained.

(4) According to the preferred mode, by arranging one or two or more spacers 10a . . . , 10as . . . , and 10at . . . in the peripheral direction Ff on a portion in contact with the rear surface portion of the pressure-receiving ring block portion 3 and excluding the pressure detection elements 5a . . . , spaces between the pressure detection elements 5a . . . can be filled with the spacers 10a . . . , 10as . . . , and 10at . . . . Thus, alignment control of the pressure detection elements 5a . . . in assembling is assisted, and alignment control can be made accurately and easily as well as reliably and stably. In addition, mechanical strength can be improved, and contribution can be made to cost reduction accompanying quantity reduction of the pressure detection elements 5a . . . .

(5) According to the preferred mode, by arranging the pressure detection elements 5a . . . and the spacers 10a . . . , 10as . . . , and 10at . . . alternately in the peripheral direction Ff of the pressure-receiving ring block portion 3, good stress balance can be obtained in assisting alignment control and a control action can be realized in the most preferable form from a viewpoint of stability.

(6) According to the preferred mode, by selecting the a length of the spacers 10a..., 10as..., and 10at... in the axial direction Fs in accordance with the length of the pressure detection elements 5a... in the axial direction Fs, the action (function) by arranging the spacers 10a..., 10as..., and 10at... can be exerted most effectively.

(7) According to the preferred mode, by providing the elastic portions 2es and 2is by forming the bent portions (or curved portions) 11e and 11i in the intermediate portion Xm of the outer cylinder portion 2e and the inner cylinder portion 2i, they can be integrally formed of a part of the outer cylinder portion 2e and the inner cylinder portion 2i. Thus, easy and optimal form in terms of manufacture can be realized.

(8) According to the preferred mode, by coating the front surface 5af... of the pressure detection elements 5a..., the rear surface 3r of the pressure receiving ring block portion 3, the rear surfaces 5ar... of the pressure detection elements 5a..., and the front surface 6f of the support ring block portion 6 with the bonding layer C formed of the inner layer Ci which becomes the adhesion reinforcing layer, the intermediate layer Cm which becomes the diffusion preventing layer, and the outer layer Ce which becomes the diffusion layer, the three components with different material qualities, that is, the pressure-receiving ring block portion 3, the pressure detection elements 5a and the support ring block portion 6 can be reliably bonded by interposition of the bonding layer C....

(9) According to the preferred mode, by providing the alignment control layer 14 for the pressure detection elements 5a... using the molten bonding layer having the predetermined thickness Ls on the rear surface 3r of the pressure-receiving ring block portion 3, the front surface 6f of the support ring block portion 6, the front surface 5af... of each of the pressure detection elements 5a... or the rear surface 5ar... of each of the pressure detection elements 5a..., appropriate alignment control can be made easily for each of the pressure detection elements 5a... by using the rear surface 3r of the pressure-receiving ring block portion 3 and the front surface 6f of the support ring block portion 6 and moreover, the alignment control layer 14. Therefore, even if at least one or more pressure detection elements 5a... are used, variation in dimension or angle can be absorbed, and detection accuracy can be further improved.

(10) According to the preferred mode, by providing the connector portion 16 connecting the electrode 4 and the lead 15 to the portion where there are not pressure detection elements 5a... in the one electrode 4 and by providing the compressed spring 17 interposed between the lead 15 and the electrode 4 in the connector portion 16, connection of the lead 15 to the electrode 4 can be made reliably, and reliable connection can be realized.

REFERENCE SIGNS LIST

1: cylinder internal-pressure sensor for an engine, 2: housing unit, 2e: outer cylinder portion, 2i: inner cylinder portion, 2es: elastic portion, 2is: elastic portion, 3: pressure-receiving ring block portion, 3f: front surface of pressure-receiving ring block portion, 3r: rear surface of pressure-receiving ring block portion, 4: one electrode portion, 5a, 5b, 5c: pressure detection element, 5af: front surface of pressure detection element, 5ar: rear surface of pressure detection element, 6: support ring block portion, 6f: front surface of support ring block portion, 7: the other electrode, 10a: spacer, 10as: spacer, 10at: spacer, 11e: bent portion (or curved portion), 11i: bent portion (or curved portion), 12: pressure receiving ring main body portion, 13: insulating block portion, 14: alignment control layer, 15: lead, 16: connector portion, 17: spring, Ec: cylinder of engine, Ma: functional component (injector), Mb: functional component (ignition plug), Mas: outer peripheral surface at distal end portion of functional component, Mbs: outer peripheral surface at distal end portion of functional component, Pc: internal pressure, Fs: axial direction, Ff: peripheral direction, Xm: intermediate portion, Ci: inner layer, Cm: intermediate layer, Ce: outer layer, Ls: predetermined thickness, combustion chamber Rb of engine

DESCRIPTION OF EMBODIMENTS

Subsequently, a best embodiment according to the present invention will be described in detail on the basis of the attached drawings.

First, a configuration of a cylinder internal-pressure sensor 1 according to the present invention will be described by referring to FIGS. 1 to 8.

Figure 1:
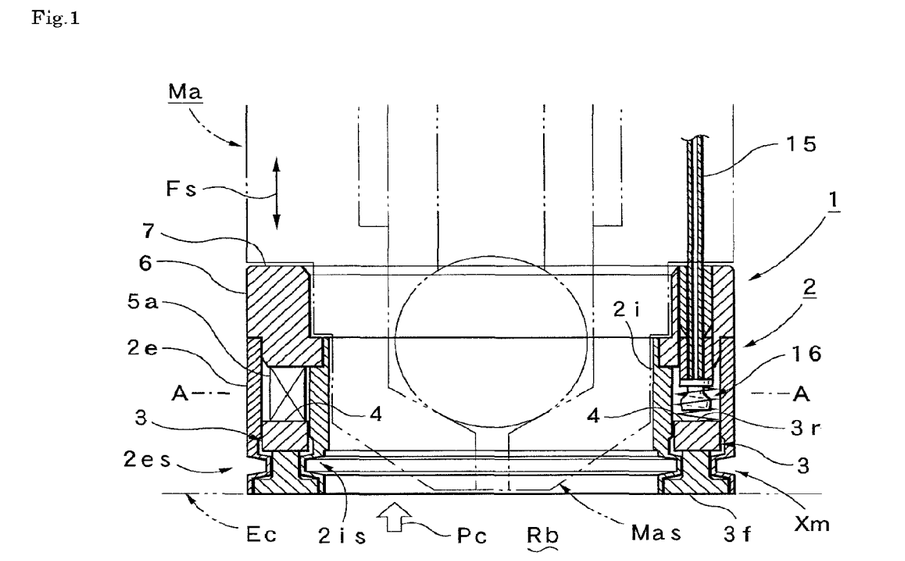
FIG. 1 is a sectional side view when a cylinder internal-pressure sensor according to the best mode of the present invention is applied to an injector.
Figure 3:
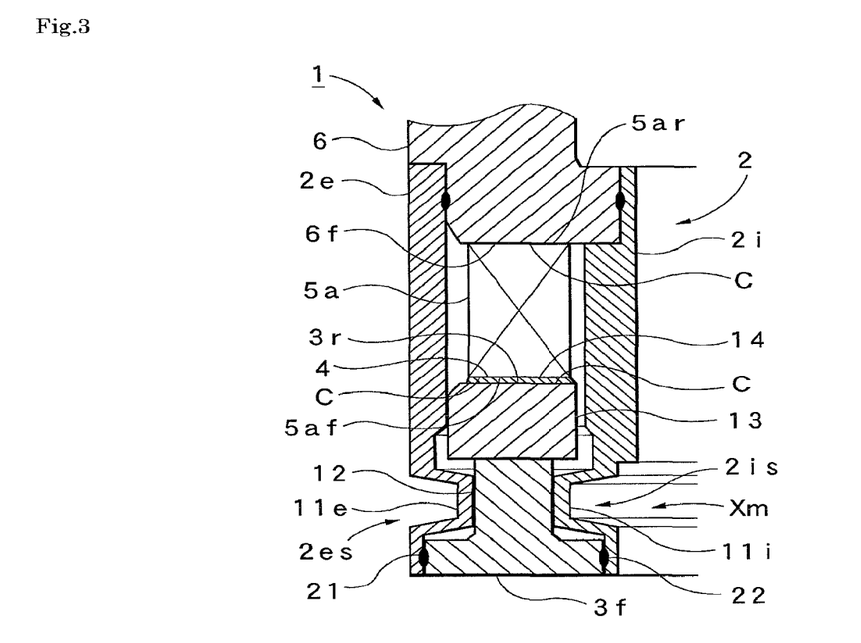
FIG. 3 is an extracted enlarged view of a portion including a pressure detection element in FIG. 1.

FIG. 1 illustrates a configuration of an essential part of the cylinder internal-pressure sensor 1. Reference numeral 2 denotes a housing unit and is provided with an outer cylinder portion 2e having a large diameter and an inner cylinder portion 2i having a small diameter. The outer cylinder portion 2e and the inner cylinder portion 2i are integrally formed of an alloy material or the like with excellent heat resistance, respectively, and elastic portions 2es and 2is having elasticity in an axial direction Fs are provided in an intermediate portion Xm in the axial direction Fs, respectively. Regarding the intermediate portion Xm, as illustrated in FIG. 1, a position closer to the front of the housing unit 2 or preferably a position on the rear by approximately several [mm] from a front end of the housing unit 2 is selected. In FIG. 1, a lower part is the front. Moreover, the elastic portions 2es and 2 is are, as illustrated in FIG. 3, formed of bent portions 11e and 11i, respectively. That is, the elastic portion 2es of the outer cylinder portion 2e is formed of the bent portion 11e formed by having an outer peripheral surface of the intermediate portion Xm swollen in the center direction, a recess groove having a trapezoidal (rectangular) section is provided in a ring shape in a peripheral direction Ff on the outer peripheral surface, and the elastic portion 2 is of the inner cylinder portion 2i is formed of the bent portion 11i formed by having an inner peripheral surface of the intermediate portion Xm swollen in the radial direction, and a recess groove having a trapezoidal (rectangular) section is provided in the ring shape in the peripheral direction Ff on the inner peripheral surface. In this case, the outer cylinder portion 2e and the inner cylinder portion 2i are formed thin from the intermediate portion Xm to the front end and elasticity (spring characteristics) in the axial direction Fs is given at least to the intermediate portion Xm. As a result, the elastic portions 2es and 2 is each having a constricted shape (bellows shape) are provided on the intermediate portion Xm of the housing unit 2. As described above, by providing the elastic portions 2es and 2 is by forming the bent portions 11e and 11i on the intermediate portion Xm of the outer cylinder portion 2e and the inner cylinder portion 2i, they can be integrally formed of a part of the outer cylinder portion 2e and the inner cylinder portion 2i. Thus, there is an advantage that the invention can be put into practice in an easy and optimal form in terms of manufacture.

On the other hand, a pressure-receiving block portion 3 hermetically fixed between the outer cylinder portion 2e and the inner cylinder portion 2i located on the front of the elastic portions 2es and 2is and reaching the rear of the elastic portions 2e and 2i through the elastic portions 2e and 2i is provided. A pressure-receiving ring block portion 3 is composed of a pressure-receiving ring main body portion 12 disposed on the front side and an insulating block portion 13 brought into contact with the pressure-receiving ring main body portion 12 by being disposed on the rear side. As a result, a front surface of the pressure-receiving ring main body portion 12 becomes a front surface 3f of the pressure-receiving ring block portion 3, and this front surface 3f becomes a pressure receiving surface receiving an internal pressure Pc.

The pressure-receiving ring main body portion 12 is integrally formed having a ring shape from an alloy material excellent in heat resistance or the like in entirety and the section is formed having T-shape of a wide width portion and a narrow width portion, as illustrated in FIG. 3. The wide width portion in the pressure-receiving ring main body portion 12 is accommodated so as to fill a space between the outer cylinder portion 2e and the inner cylinder portion 2i located on the front of the intermediate portion Xm of the housing unit 2 and hermetically fixed to the inner peripheral surface of the outer cylinder portion 2e and the outer peripheral surface of the inner cylinder portion 2i by welded portions 21 and 22 using laser welding or the like, so that a combustion gas in a combustion chamber Rb does not go into the cylinder internal-pressure sensor 1. At this time, the narrow width portion in the pressure-receiving ring main body portion 12 reaches the rear of the elastic portions 2e and 2i through between the elastic portions 2e and 2i.

Figure 7:
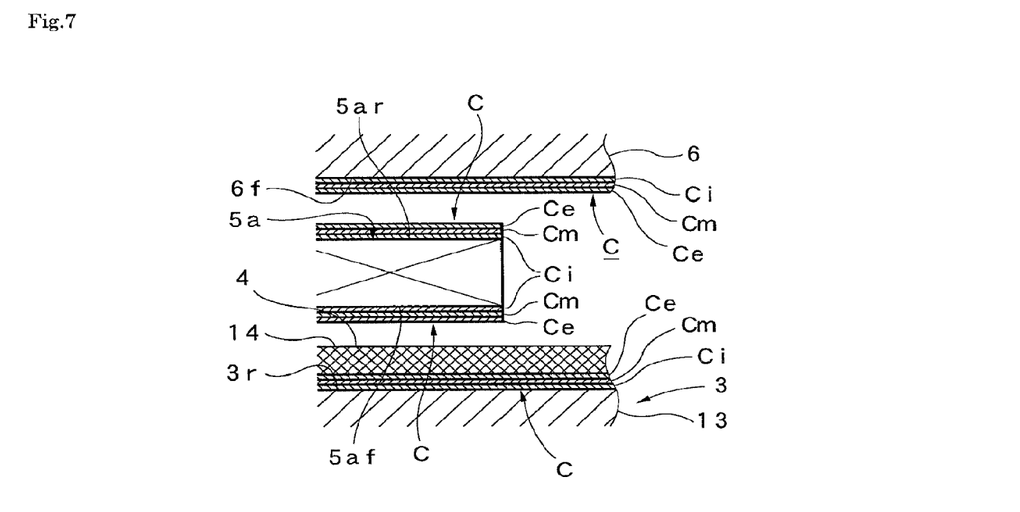
FIG. 7 is a schematic sectional view clearly illustrating a bonding layer in the cylinder internal-pressure sensor.

Moreover, an insulating block portion 13 is integrally formed having a ring shape from an insulating material having rigidity and has a rectangular section. Therefore, a rear surface of the insulating block portion 13 becomes a rear surface 3r of the pressure-receiving ring block portion 3. Moreover, on the rear surface 3r of the pressure-receiving ring block portion 3, one electrode portion 4 is provided. In this case, as illustrated in FIG. 7, the rear surface 3r of the pressure-receiving ring block portion 3, that is, a rear surface of the insulating block portion 13 is coated with a bonding layer C made of an inner layer Ci using Ti (titanium) which becomes an adhesion reinforcing layer, an intermediate layer Cm using Pt (platinum) which becomes a diffusion preventing layer, and an outer layer Ce using Au (gold) which becomes a diffusion layer, and on this bonding layer C, an alignment control layer 14 which becomes a molten bonding layer having a predetermined thickness Ls using Au—Sn (gold-tin) is provided by coating. This alignment control layer 14 has an alignment control function for absorbing variation in dimensions, angles and the like of three pressure detection elements 5a . . . which will be described later and also functions as the one electrode portion 4 of the pressure detection elements 5a . . . . Therefore, for the thickness Ls of the alignment control layer 14, a dimension which can absorb variation in dimensions, angles and the like of three (or at least one or more) pressure detection elements 5a . . . is set.

Any one of Ni, Cr, Zr, In, Bi, Y and the like other than the above can be selected and used for the inner layer Ci which becomes the adhesion reinforcing layer, Cu, Sn, Ni, Fe, Cr, V, Ti and the like other than the above can be selected and used for the intermediate layer Cm which becomes the diffusion preventing layer, and Ag, Pd, Sn, Ge, Cu and the like other than the above can be selected and used for the outer layer Ce which becomes the diffusion layer, respectively. In this case, each of the layers Ci, Cm and Ce may be composed of a single element or may be composed of an alloy containing a single element. Moreover, any one of metal (alloy) having an eutectic phenomenon such as Ag—Cu—Sn, Au—Ge, Au—Pd, Ag—Pd, Ag—Sn, Cu—Sb and the like other than the above can be used for the alignment control layer 14 which becomes the molten bonding layer. Each of these layers may be used as solder or may be used as a brazing material. Therefore, the alignment control layer 14 which becomes a molten bonding layer and the outer layer Ce which becomes the diffusion layer needs combination. For example, if Au—Sn is used for the alignment control layer 14, Au or Sn needs to be used for the outer layer Ce, and if Ag—Pd is used for the alignment control layer 14, Ag or Pd needs to be used for the outer layer Ce. As such, the material of the diffusion layer (outer layer Ce) needs to be selected as a single material or a composite material in the materials constituting the alignment control layer 14.

On the other hand, 5a, 5b, and 5c indicate three pressure detection elements (piezo-electric elements). Each of the pressure detection elements 5a . . . is manufactured by using a single crystal material having excellent heat resistance and spontaneous polarization without a Curie point, capable of obtaining stable piezoelectric conversion characteristics in a wide temperature range. Specifically, a single crystal material such as LNG, LGSA, LNGA, CAAS, CTGS and the like including a single crystal material LTG ($La_3Ta_{0.5}Ga_{5.5}O_{14}$), LTGA ($La_3Ta_{0.5}Ga_{4.8}Al_{0.2}O_{14}$), and LGS ($La_3Ga_5SiO_{14}$). Moreover, each of the pressure detection elements 5a . . . is sandwiched between the above described insulating block portion 13 and the support ring block portion 6 which will be described later, and the front surface and the rear surface are bonded to the rear surface of the insulating block portion 13 (alignment control layer 14) and the front surface of the support ring block portion 6, respectively, thus, the front surfaces 5af . . . and the rear surfaces 5ar . . . of each of the pressure detection elements 5a . . . are coated with the bonding layer C made of the above described inner layer Ci, the intermediate layer Cm, and the outer layer Ce, respectively, as illustrated in FIG. 7.

Figure 2:
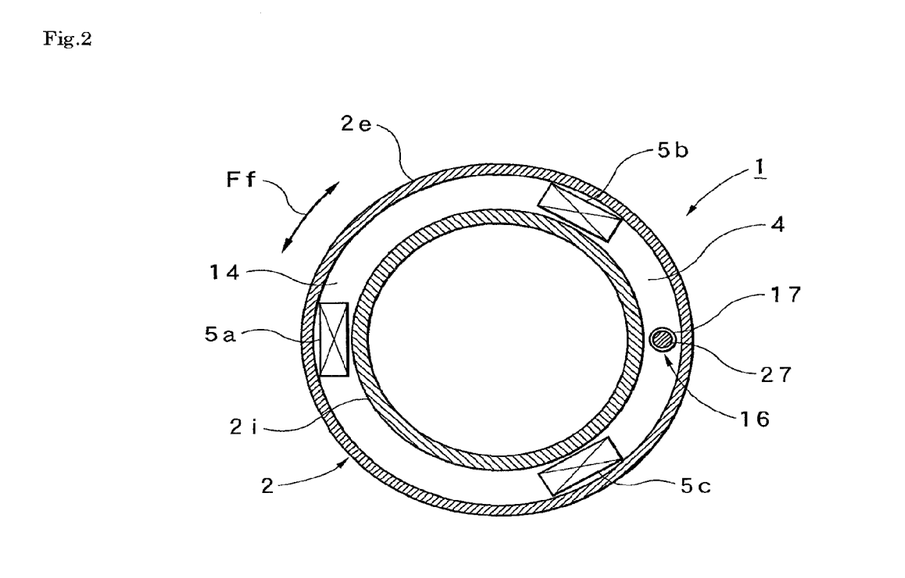
FIG. 2 is an A-A line sectional plan view in FIG. 1.
Figure 8:
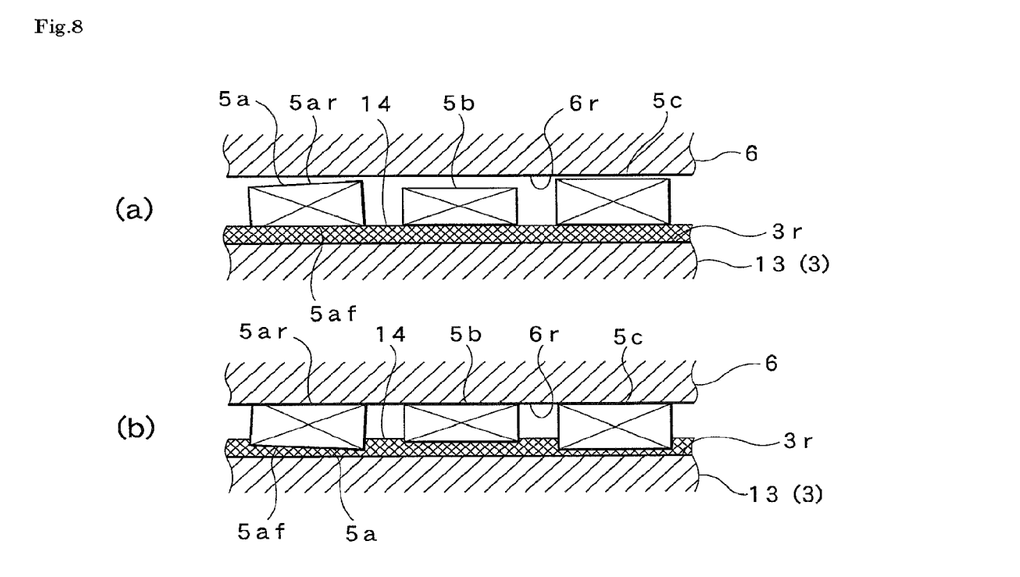
FIG. 8 are explanatory diagrams of when alignment control of the pressure detection element is made in the cylinder internal-pressure sensor.

Then, when the pressure detection elements 5a, 5b, and 5c are to be assembled, as illustrated in FIG. 8A, the alignment control layer 14 provided on the rear surface 3r of the insulating block portion 13 before heating treatment is set so as to be directed upward, and the three pressure detection elements 5a, 5b, and 5c are placed on this alignment control layer 14 at equal intervals as illustrated in FIG. 2. Then, the front surface 6f of the support ring block portion 6 is abutted to the rear surface 5ar (upper surface) of each of the pressure detection elements 5a . . . , and each of the pressure detection elements 5a . . . is pressurized from above with a uniform force, while being heated in a reflow continuous furnace set to a predetermined temperature environment. As a result, as illustrated in FIG. 8B, the front surfaces 5af . . . (lower surfaces) of each of the pressure detection elements 5a . . . enter the appropriately molten alignment control layer 14, and the rear surfaces 5ar . . . (upper surfaces) of each of the pressure detection elements 5a . . . is brought into planar contact with the front surface 6f of the support ring block portion 6, respectively. That is, alignment control in which variation in dimensions, angles and the like of each of the pressure detection elements 5a, 5b, and 5c are absorbed by the alignment control layer 14 is executed. Moreover, at this time, the bonding layers C . . . provided on the front surfaces 5af . . . of each of the pressure detection elements 5a . . . are deposited on the alignment control layer 14 and also, the bonding layers C . . . provided on the rear surfaces 5ar . . . of each of the pressure detection elements 5a is deposited on the bonding layer C provided on the front surface 6f of the support ring block portion 6 at the same time.

Therefore, after the alignment control layer 14 and the bonding layers C . . . are solidified, the insulating block portion 13, each of the pressure detection elements 5a . . . and the support ring block portion 6 are integrally bonded. That is, an alignment control process and an assembling process are performed together (at the same time). At this time, the front end portion of the support ring block portion 6 is accommodated between the rear end portions of the outer cylinder portion 2e and the inner cylinder portion 2i and fixed to the inner peripheral surface of the outer cylinder portion 2e and the outer peripheral surface of the inner cylinder portion 2i by welding portions 23 and 24. By means of the above described assembling process, the support ring block portion 6 blocks the rear end between the outer cylinder portion 2e and the inner cylinder portion 2i as illustrated in FIG. 1, and the front surface 6f of the support ring block portion 6 fixed to the rear end of the housing unit 2 becomes a support surface supporting each of the pressure detection elements 5a, 5b, and 5c. The support ring block portion 6 also functions as the other electrode 7 (ground) of each of the pressure detection elements 5a, 5b, and 5c.

As described above, by coating the bonding layer C made of the inner layer Ci, the intermediate layer Cm, and the outer layer Ce on the front surfaces 5af . . . of the pressure detection elements 5a . . . , the rear surface 3r of the pressure-receiving ring block portion 3, the rear surfaces 5ar . . . of the pressure detection elements 5a . . . , and the front surface 6f of the support ring block portion 6, the three components with different materials, that is, the pressure-receiving ring block portion 3, the pressure detection elements 5a . . . and the support ring block portion 6 can be reliably bonded by means of interposition of the bonding layers C . . . . Moreover, by providing the alignment control layer 14 for the pressure detection elements 5a . . . using the molten bonding layer such as Au—Sn or the like having the predetermined thickness Ls on the rear surface 3r of the pressure-receiving ring block portion 3, accurate alignment control can be easily executed for each of the pressure detection elements 5a . . . by using the rear surface 3r of the pressure-receiving ring block portion 3 and the front surface 6f of the support ring block portion 6 and moreover, the alignment control layer 14. Therefore, even if the three (or at least one or more) pressure detection elements 5a . . . are used, variation in dimensions and angles can be absorbed, and detection accuracy can be improved.

Figure 4:
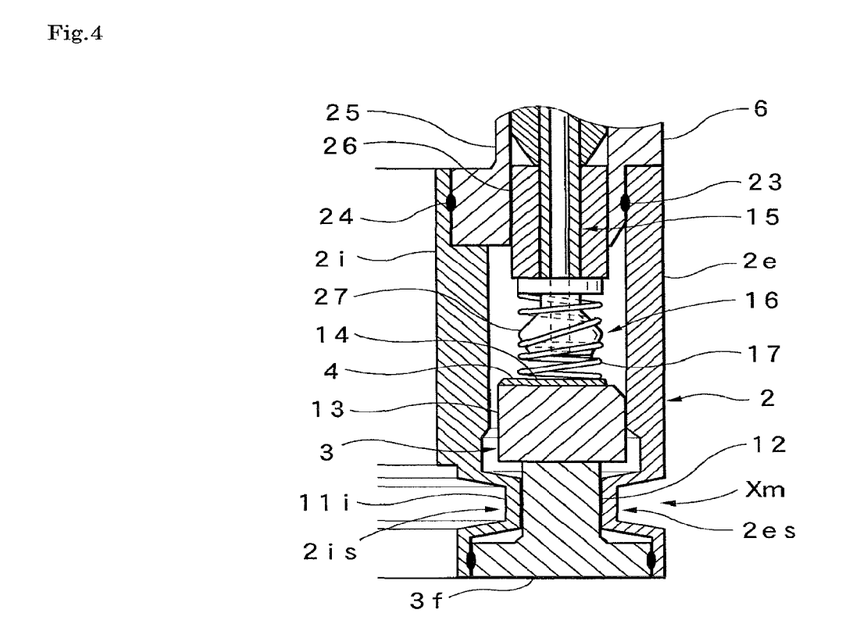
FIG. 4 is an extracted enlarged view of a portion including a connector portion in FIG. 1.
Figure 5:
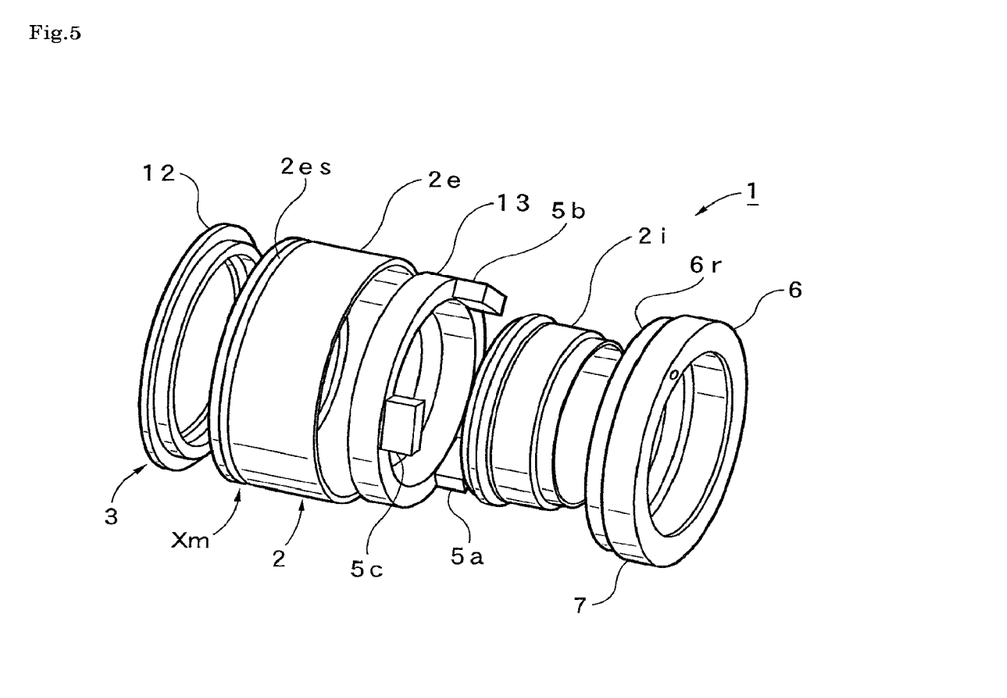
FIG. 5 is an exploded perspective view of the cylinder internal-pressure sensor.

On the other hand, the alignment control layer 14 functions also as the one electrode portion 4 provided on the rear surface 3r of the pressure-receiving ring block portion 3. Therefore, a lead (shield cable) 14 leading out to the outside is connected to the solidified alignment control layer 14 (electrode 4). In this case, the electrode 4 and the lead 14 are connected through a connector portion 16. FIG. 4 illustrates a connection structure between the lead 15 and the electrode 4 in an enlarged manner. The lead 15 leading in from the outside penetrates the support ring block portion 6 and has a distal end thereof faced with the electrode 4. At this time, the lead 15 penetrating the support ring block portion 6 is held by a crimping pipe 25 and an insulating pipe 26 as illustrated in FIG. 4. Moreover, at a distal end of the insulating pipe 26, a spring holding terminal 27 of the connector portion 16 to which the distal end of the lead 15 is connected is mounted. This spring holding terminal 27 is disposed in a space between the support ring block portion 6 and the insulating block portion 13 where the pressure detection elements 5a . . . are not present and is faced with the electrode 4, as illustrated in FIG. 2. One end of the spring 17 in a compressed state is attached to the spring holding terminal 27 and the other end of the spring 17 is brought into pressure contact with the upper surface of the electrode 4. Therefore, by providing such connector portion 16, connection of the lead 15 to the electrode 4 can be reliably realized, and reliable connection can be made.

As described above, the cylinder internal-pressure sensor 1 according to this embodiment has a basic structure in which it is brought into contact with the one electrode portion 4 provided on the rear surface 3r of the pressure-receiving ring block portion 3 having the front surface 3f as a pressure receiving surface and the three (or at least one or more) pressure detection elements 5a . . . disposed at equal intervals in the peripheral direction Ff are used. Therefore, even if the cylinder internal-pressure sensor 1 having a ring shape using a single crystal material with large fragility and attached to the outer peripheral surface Mas on the distal end portion of the injector Ma attached to the cylinder Ec as will be described later is constituted as the pressure detection elements 5a . . . , manufacture (machining) of the pressure detection elements 5a . . . becomes easy, yield and mass productivity are improved, and contribution can be made to cost reduction. Moreover, nonconformity such as a crack hardly occurs and reliability can be improved.

Subsequently, a use method and an operation (function) of the cylinder internal-pressure sensor 1 according to this embodiment will be described by referring to FIGS. 1 to 8.

Figure 6:
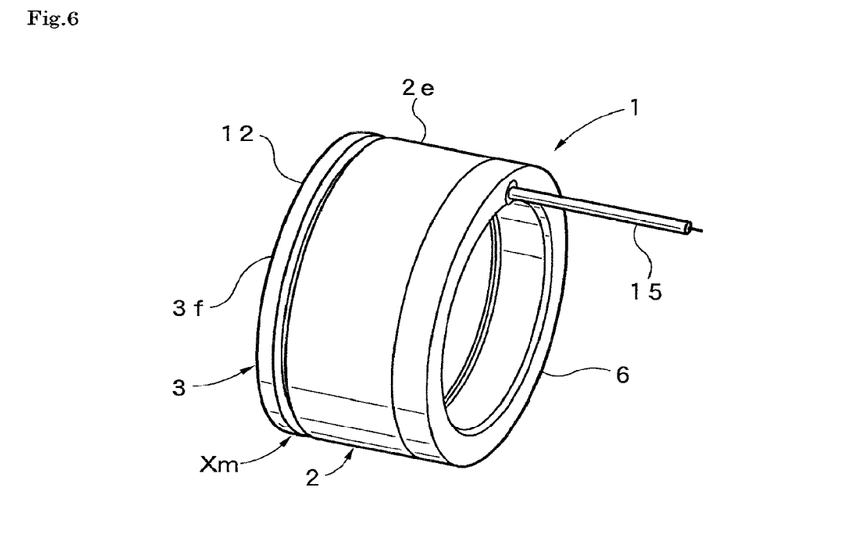
FIG. 6 is an appearance perspective view of the cylinder internal-pressure sensor.

First, since the cylinder internal-pressure sensor 1 is covered by the housing unit 2 and the like having a cylindrical shape (ring shape) in entirety, as illustrated in FIG. 6, the entire detection structure of the pressure detection elements 5a . . . , the electrodes 4 and 7 and the like can be effectively protected from the severe temperature and vibration environment when the combustion pressure of the engine is detected, and stable attachment to the cylinder Ec and a stable operation are ensured. Therefore, as indicated by a virtual line in FIG. 1, the cylinder internal-pressure sensor 1 can be easily attached to the outer peripheral surface Mas of the distal end portion of the injector Ma for injecting fuel into the cylinder Ec, while being faced with the combustion chamber Rb of the engine of an automobile and the like. That is, when the injector Ma is to be assembled to the cylinder Ec, the cylinder internal-pressure sensor 1 can be also assembled to the injector Ma together as a part of the injector Ma in a sense. That is, it is no longer necessary to form a separate through hole at a predetermined position of the cylinder Ec and to attach the sensor independently by a highly hermetical structure in this through hole.

On the other hand, at detection of the internal pressure Pc in the cylinder Ec, since the internal pressure Pc is applied to the pressure receiving surface (front surface 3f) of the pressure-receiving ring block portion 3, this internal pressure Pc acts on each of the pressure detection elements 5a, 5b, and 5c through the pressure-receiving ring main body portion 12 and the insulating block portion 13. At this time, since the pressure-receiving ring main body portion 12 constituting the pressure-receiving ring block portion 3 is supported by the expanding/contracting elastic portions 2es and 2 is having elasticity in the axial direction Fs, displacement (pressure) of the pressure-receiving ring main body portion 12 caused by the internal pressure Pc is stably (uniformly) and reliably transmitted by the expanding/contracting elastic portions 2es and 2 is to each of the pressure detection elements 5a . . . , and highly accurate pressure detection is made. In addition, since each of the pressure detection elements 5a, 5b, and 5c is alignment-controlled by the alignment control layer 14, as illustrated, even if the three pressure detection elements 5a . . . are used, variation in dimensions and angles is absorbed, and detection accuracy is further improved.

Subsequently, the cylinder internal-pressure sensor 1 according to a modified embodiment of the present invention will be described by referring to FIGS. 9 to 14.

Figure 9:
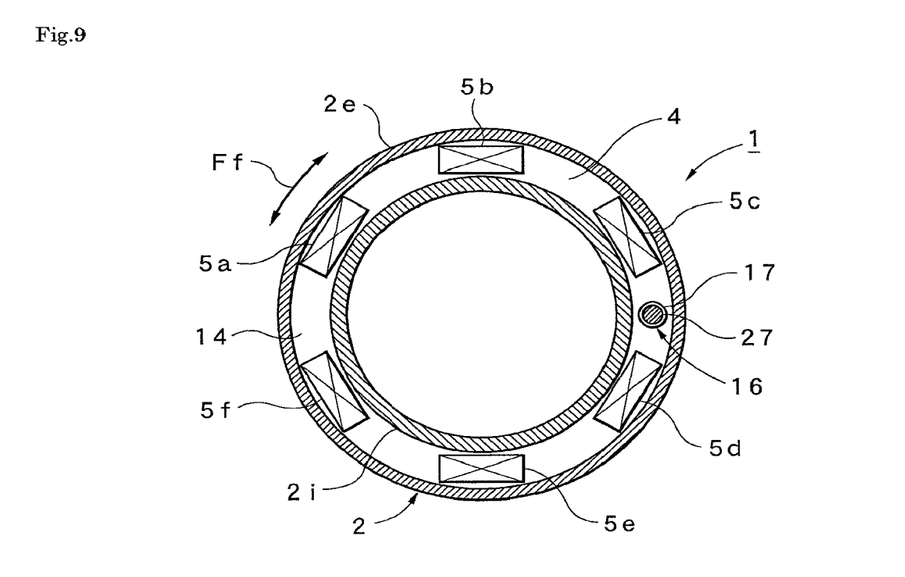
FIG. 9 is the A-A line sectional plan view in FIG. 1 in the cylinder internal-pressure sensor according to a modified embodiment of the present invention.

In the modified embodiment illustrated in FIG. 9, the number of pressure detection elements 5a . . . in use is changed. In the above described embodiment illustrated in FIG. 2, a case in which the three pressure detection elements 5a . . . are used is illustrated, but in the modified embodiment illustrated in FIG. 9, six pressure detection elements 5a, 5b, 5c, 5d, 5e, and 5f are used and disposed at equal intervals in the peripheral direction Ff. As described above, in the cylinder internal-pressure sensor 1 according to the present invention, an arbitrary quantity of at least one or more pressure detection elements 5a . . . can be used. In the case of an even number, it can be configured such that two pressure detection elements 5a . . . are used and the remaining pressure detection elements are used as dummies having a matching size, and such dummies are also included in the quantity of the pressure detection elements 5a . . . .

Figure 10:
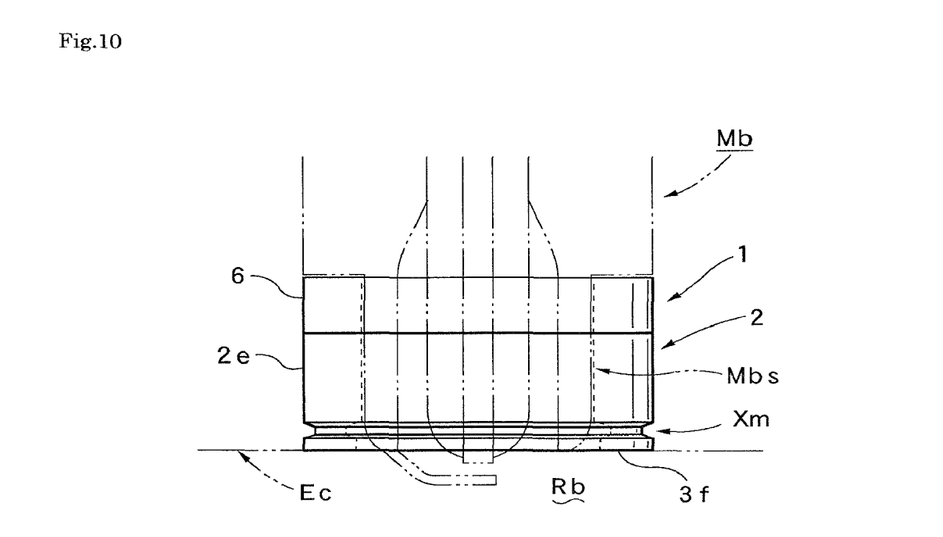
FIG. 10 is a sectional side view of when the cylinder internal-pressure sensor according to another modified embodiment of the present invention is applied to an ignition plug.

In a modified embodiment illustrated in FIG. 10, an application of the cylinder internal-pressure sensor 1, that is, a functional component to which the cylinder internal-pressure sensor 1 is attached is changed. In the embodiment illustrated in FIG. 1, a case in which the cylinder internal-pressure sensor 1 is attached to the injector Ma for injecting fuel into the cylinder Ec is illustrated, but in the modified embodiment illustrated in FIG. 10, a case in which the cylinder internal-pressure sensor 1 is attached to an outer peripheral surface Mbs of a distal end portion of the ignition plug Mb for igniting fuel in the cylinder Ec is illustrated. If the shape of the cylinder internal-pressure sensor 1 with respect to the outer peripheral surface Mbs of the distal end portion of the ignition plug Mb is different, the shape of the inner cylinder portion 2i of the housing unit 2 is changed so as to match the shape of the ignition plug Mb to which the cylinder internal-pressure sensor 1 is to be attached. As described above, the cylinder internal-pressure sensor 1 can be easily attached to various functional components such as the injector Ma, the ignition plug Mb and the like, and the highly usable cylinder internal-pressure sensor 1 can be obtained.

Figure 11:
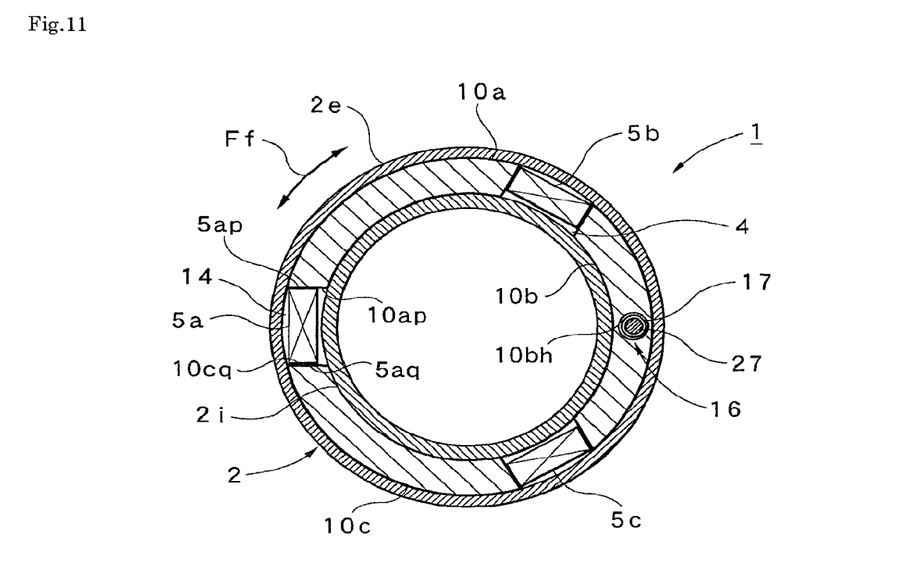
FIG. 11 is a sectional plan view corresponding to a A-A line position in FIG. 1 in the cylinder internal-pressure sensor according to another modified embodiment of the present invention.
Figure 12:
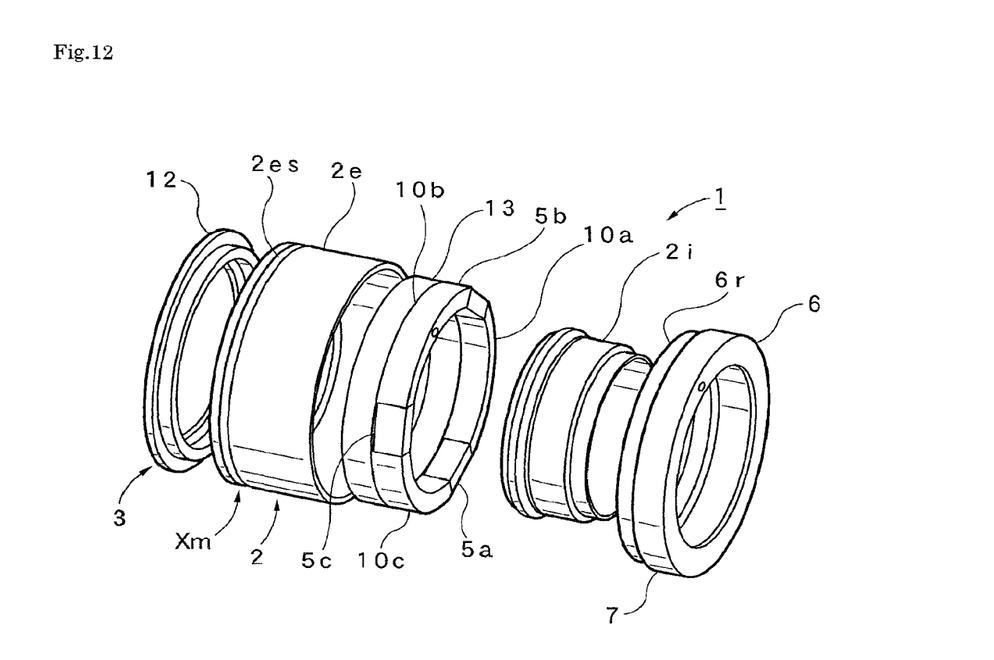
FIG. 12 is an exploded perspective view of the cylinder internal-pressure sensor in FIG. 11.
Figure 13:
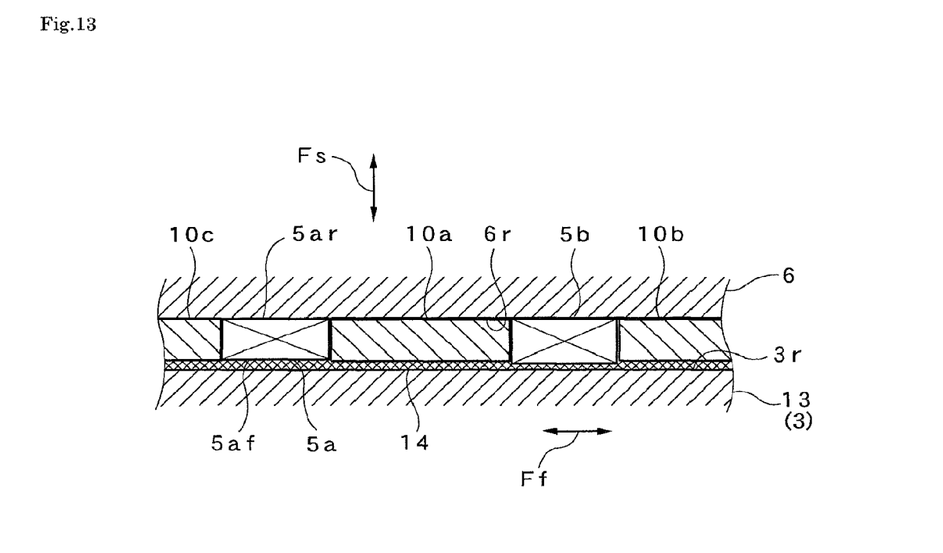
FIG. 13 is an explanatory diagram of when alignment control of the pressure detection element is made in the cylinder internal-pressure sensor in FIG. 11.

In a modified embodiment illustrated in FIGS. 11 to 13, a mounting form of the pressure detection elements 5a . . . is changed, and as illustrated in FIG. 12, spacers 10a . . . in the peripheral direction Ff are arranged on a portion in contact with the rear surface 3r of the pressure-receiving ring block portion 3, that is, a rear-surface portion of the insulating block portion 13 (including the alignment control layer 14) and excluding the pressure detection elements 5a . . . . By arranging such spacers 10a . . . , as illustrated in FIG. 13, the space between the pressure detection elements 5a . . . can be filled by the spacers 10a . . . , 10as . . . , and 10at . . . , and thus, alignment control of the pressure detection elements 5a . . . in assembling is assisted so that alignment control can be made accurately and easily and moreover, reliably and stably.

Illustrated is a case in which three spacers 10a, 10b, and 10c formed of a ceramic material are used. Moreover, a width of each of the spacers 10a is substantially matched with the width of the pressure-receiving ring block portion 3, and a length in the axial direction Fs is selected in accordance with the length in the axial direction Fs of each of the pressure detection elements 5a . . . . In this case, the length in the axial direction Fs is preferably matched with the length in the axial direction Fs of each of the pressure detection elements 5a . . . but does not necessarily have to be matched with that and can be changed depending on the thickness of the alignment control layer 14 or the material of the spacers 10a . . . . Since a rigid body (ceramic material) is used for the material of the illustrated spacers 10a . . . , the thickness of each of the spacers 10a . . . (0.89 [mm]) slightly smaller than the thickness of each of the pressure detection elements 5a . . . (0.9 [mm]) was selected. The material of the spacers 10a . . . is not limited to the rigid body, and a material having elasticity to some degree may be used. Therefore, the thickness of each of the spacers 10a . . . may be larger than the thickness of each of the pressure detection elements 5a . . . as necessary. As described above, by selecting the length in the axial direction Fs of each of the spacers 10a . . . in accordance with the length in the axial direction Fs of each of the pressure detection elements 5a . . . , an action (function) realized by arranging the spacers 10a . . . can be exerted most effectively. In addition, in FIG. 11, reference numeral 10bh denotes a through hole through which the spring holding terminal 27 and the spring 17 are inserted.

Furthermore, the pressure detection elements 5a . . . and the spacers 10a . . . are alternately arranged in the peripheral direction Ff of the pressure-receiving ring block portion 3. By arranging as above, good stress balance can be obtained in assisting alignment control and the control action can be realized in the most preferable form from a viewpoint of stability. The pressure detection elements 5a . . . and the spacers 10a . . . are preferably arranged alternately but do not necessarily have to be arranged alternately, and the spacers 10a . . . do not have to be present alternately between the pressure detection elements 5a . . . as necessary.

Figure 14:
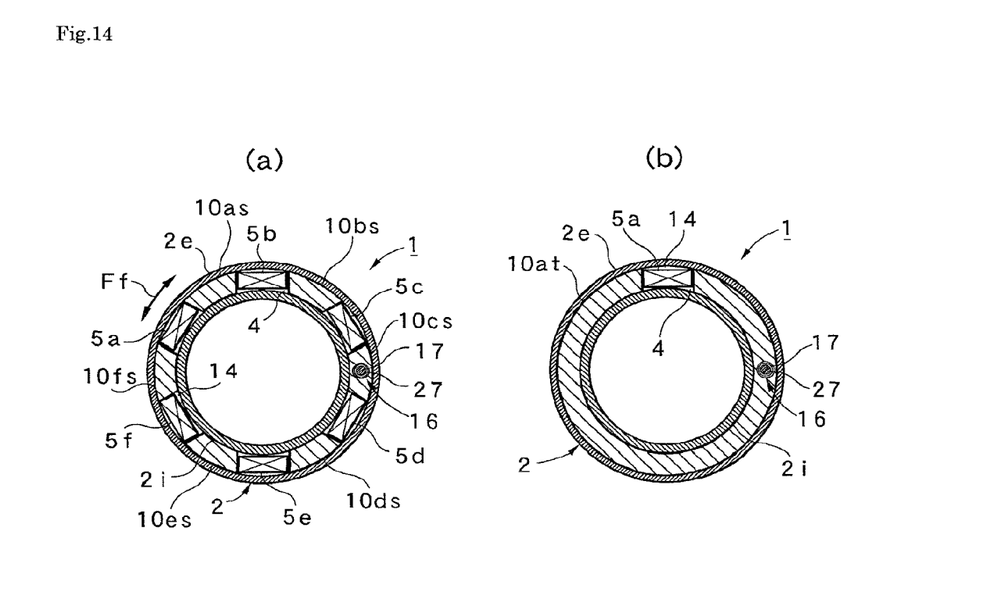
FIG. 14 are sectional plan views corresponding to the A-A line position in FIG. 1 in the cylinder internal-pressure sensor according to another modified embodiment of the present invention.

In modified embodiments illustrated in FIGS. 14A and 14B, though spacers 10*as* and 10*at* similar to the spacers 10*a* . . . illustrated in FIG. 11 are used, the number of the pressure detection elements 5*a* . . . is changed. In FIG. 14A, six pressure detection elements 5*a*, 5*b*, 5*c*, 5*d*, 5*e*, and 5*f* are used and arranged at equal intervals in the peripheral direction Ff, and six spacers 10*as*, 10*bs*, 10*cs*, 10*ds*, 10*es*, and 10*fs* are arranged alternately between the pressure detection elements 5*a* . . . similarly to FIG. 11. Therefore, each of the spacers 10*as* . . . can be manufactured similarly to the spacers 10*a* . . . except that the length in the peripheral direction Ff is different. On the other hand, FIG. 14B illustrates a case in which the single pressure detection element 5*a* is used and arranged at a predetermined position in the peripheral direction Ff. Even this case can be put into practice similarly to FIG. 11 by using the single spacer 10*at* formed having an entire shape of a C-shape. As described above, the present invention can be put into practice even with one pressure detection element 5*a* by using the spacer 10*at*. Thus, by using the spacers 10*a* . . . , 10*as* . . . , and 10*at* . . . , illustrated in FIGS. 11 to 14 as above, mechanical strength when assembling the pressure detection elements 5*a* . . . can be improved, and a cost can be reduced with the decrease in the number of the pressure detection elements 5*a* . . . in addition to the above described advantages. In FIGS. 9 to 14, the same reference numerals are given to the same portions as in FIGS. 1 to 8 in order to clarify the configuration, and detailed description will be omitted.

The best mode of embodiment and modified embodiments are described in detail, but the present invention is not limited to these embodiments and is capable of arbitrary change, addition, and deletion within a range not departing from the spirit of the present invention in the configuration of the details, shapes, materials, quantities, methods and the like.

For example, regarding the elastic portions 2*es* and 2 *is*, the case in which they are provided by forming the bent portions 11*e* and 11*i* is illustrated, but they may be formed by semicircular curved portions or may be constituted by a combination of a plurality of bent portions (or curved portions) 11*e* . . . and 11*i* . . . as a bellows shape. Moreover, the cases in which the injector Ma and the ignition plug Mb are applied as the functional components are illustrated, but the cylinder internal-pressure sensor 1 can be also combined with other sensors (functional components) such as a temperature sensor and the like. On the other hand, the case in which the pressure-receiving ring block portion 3 is constituted by a combination of the pressure-receiving ring main body portion 12 and the insulating block portion 13 is illustrated, but it may be an integral type. Furthermore, it is preferable that a single crystal material is used for the pressure detection elements 5*a* . . . , but use of other pressure detection elements having different detection principles such as a piezo element and the like is not excluded. On the other hand, the case in which the alignment control layer 14 for executing alignment control of each of the pressure detection elements 5*a* . . . is provided on the rear surface 3*r* of the pressure-receiving ring block portion 3 is illustrated, but this alignment control layer 14 may be provided on the front surface 6*f* of the support ring block portion 6 instead of the rear surface 3*r* of the pressure-receiving ring block portion 3. Moreover, the case in which the alignment control layer 14 is provided on the upper surface of the bonding layer C is illustrated, but if the bonding layer C is not provided, it may be provided directly on the rear surface 3*r* of the pressure-receiving ring block portion 3 or the front surface 6*f* of the support ring block portion 6. Furthermore, the alignment control layer 14 is preferably provided on the rear surface 3*r* of the pressure-receiving ring block portion 3 or the front surface 6*f* of the support ring block portion 6, but provision on the front surfaces 5*af* . . . of the pressure detection elements 5*a* . . . or on the rear surfaces 5*ar* . . . of the pressure detection elements 5*a* . . . is not excluded. The alignment control layer 14 does not necessarily have to be provided if the pressure detection elements 5*a* . . . whose variation in dimensions, angles and the like can be ignored due to improvement of machining accuracy are used. On the other hand, the structure of connecting the one electrode 4 and the lead 15 to each other is not limited to the illustrated configuration using the spring 17 but other connection structures are not excluded as long as the electrode 4 and the lead 15 can be connected to each other. Moreover, the ignition plug Mb includes various types of ignition plugs such as a spark plug, a glow plug and the like, and the functional components Ma and Mb faced with the combustion chamber Rb of the engine also includes a case of attachment to a piston in addition to the case of attachment to the cylinder Ec, as illustrated.

INDUSTRIAL APPLICABILITY

The cylinder internal-pressure sensor according to the present invention can be used when detecting an internal pressure of a cylinder constituting an internal combustion engine including an internal combustion engine represented by an engine of an automobile and other various applications.

The invention claimed is:

1. A cylinder internal-pressure sensor for an engine, characterized in that
the cylinder internal-pressure sensor is formed having a ring shape for detecting an internal pressure of the cylinder by being attached to an outer peripheral surface of a distal end portion of a functional component faced with a combustion chamber of the engine, and
provided with a housing unit composed of an outer cylinder portion and an inner cylinder portion having elastic portions having elasticity in an axial direction formed on an intermediate portion in the axial direction; a pressure-receiving ring block portion hermetically fixed between the outer cylinder portion and the inner cylinder portion located on the fronts of the elastic portions and faced with the rear of the elastic portions through the elastic portions and having a front surface as a pressure receiving surface; at least one or more pressure detection elements in contact with one electrode portion provided on a rear surface of this pressure-receiving ring block portion, given the internal pressure by the pressure-receiving ring block portion, and arranged at predetermined positions in a peripheral direction; and a support ring block portion fixed between the outer cylinder portion and the inner cylinder portion, having a front surface as a support surface supporting the pressure detection elements and serving also as the other electrode.

2. The cylinder internal-pressure sensor for an engine according to claim 1, wherein
one or two or more spacers are arranged in a peripheral direction on a portion in contact with a rear surface portion of the pressure-receiving ring block portion and excluding the pressure detection elements.

3. The cylinder internal-pressure sensor for an engine according to claim 2, wherein
the pressure detection elements and the spacers are arranged alternately in the peripheral direction of the pressure-receiving ring block portion.

4. The cylinder internal-pressure sensor for an engine according to claim 3, wherein
a length in the axial direction of the spacer is selected in accordance with a length in the axial direction of the pressure detection element.

5. The cylinder internal-pressure sensor for an engine according to claim 3, wherein
the elastic portion is provided by forming a bent portion or a curved portion on an intermediate portion of the outer cylinder portion and the inner cylinder portion.

6. The cylinder internal-pressure sensor for an engine according to claim 3, wherein
the pressure-receiving ring block portion is constituted by a pressure-receiving ring main body portion disposed on the front side and an insulating block portion brought into contact with the pressure-receiving ring main body portion by being disposed on the rear side.

7. The cylinder internal-pressure sensor for an engine according to claim 2, wherein
a length in the axial direction of the spacer is selected in accordance with a length in the axial direction of the pressure detection element.

8. The cylinder internal-pressure sensor for an engine according to claim 7, wherein
the elastic portion is provided by forming a bent portion or a curved portion on an intermediate portion of the outer cylinder portion and the inner cylinder portion.

9. The cylinder internal-pressure sensor for an engine according to claim 7, wherein
the pressure-receiving ring block portion is constituted by a pressure-receiving ring main body portion disposed on the front side and an insulating block portion brought into contact with the pressure-receiving ring main body portion by being disposed on the rear side.

10. The cylinder internal-pressure sensor for an engine according to claim 2, wherein
the elastic portion is provided by forming a bent portion or a curved portion on an intermediate portion of the outer cylinder portion and the inner cylinder portion.

11. The cylinder internal-pressure sensor for an engine according to claim 2, wherein
the pressure-receiving ring block portion is constituted by a pressure-receiving ring main body portion disposed on the front side and an insulating block portion brought into contact with the pressure-receiving ring main body portion by being disposed on the rear side.

12. The cylinder internal-pressure sensor for an engine according to claim 1, wherein
the elastic portion is provided by forming a bent portion or a curved portion on an intermediate portion of the outer cylinder portion and the inner cylinder portion.

13. The cylinder internal-pressure sensor for an engine according to claim 1, wherein
the pressure-receiving ring block portion is constituted by a pressure-receiving ring main body portion disposed on the front side and an insulating block portion brought into contact with the pressure-receiving ring main body portion by being disposed on the rear side.

14. The cylinder internal-pressure sensor for an engine according to claim 1, wherein
a single crystal material is used for the pressure detection elements.

15. The cylinder internal-pressure sensor for an engine according to claim 1, wherein
a front surface of the pressure detection element, a rear surface of the pressure-receiving ring block portion, a rear surface of the pressure detection element, and a front surface of the support ring block portion is coated with a bonding layer made of an inner layer which becomes an adhesion reinforcing layer, an intermediate layer which becomes a diffusion preventing layer, and an outer layer which becomes a diffusion layer.

16. The cylinder internal-pressure sensor for an engine according to claim 1, wherein
an alignment control layer is provided for the pressure detection element using a molten bonding layer having a predetermined thickness on the rear surface of the pressure-receiving ring block portion, the front surface of the support ring block portion, the front surface of the pressure detection element or the rear surface of the pressure detection element.

17. The cylinder internal-pressure sensor for an engine according to claim 1, wherein
a connector portion for connecting a lead to a portion in the one electrode where the pressure detection element is not present is provided.

18. The cylinder internal-pressure sensor for an engine according to claim 17, wherein
the connector portion is provided with a compressed spring interposed between the lead and the one electrode.

19. The cylinder internal-pressure sensor for an engine according to claim 1, wherein
the functional component is an injector for injecting fuel into the cylinder.

20. The cylinder internal-pressure sensor for an engine according to claim 1, wherein
the functional component is an ignition plug for igniting fuel in the cylinder.

* * * * *

UNITED STATES PATENT AND TRADEMARK OFFICE
CERTIFICATE OF CORRECTION

PATENT NO. : 8,915,125 B2
APPLICATION NO. : 14/004282
DATED : December 23, 2014
INVENTOR(S) : Kazuo Takahashi et al.

It is certified that error appears in the above-identified patent and that said Letters Patent is hereby corrected as shown below:

ON THE TITLE PAGE;

At item (73), Assignee, change:

"(73) Assignee:    Citizen Finetech Miyota Co., Ltd., Tokyo (JP)"

to: --(73) Assignees:    Citizen Finetech Miyota Co., Ltd., Nagano (JP); Citizen Holdings Co., Ltd., Tokyo (JP)--.

Signed and Sealed this
Twentieth Day of October, 2015

Michelle K. Lee
*Director of the United States Patent and Trademark Office*